(12) United States Patent
La Belle

(10) Patent No.: US 10,697,906 B2
(45) Date of Patent: Jun. 30, 2020

(54) SYSTEM AND METHOD FOR IDENTIFYING AN OBJECT

(71) Applicant: ARIZONA BOARD OF REGENTS ON BEHALF OF ARIZONA STATE UNIVERSITY, Scottsdale, AZ (US)

(72) Inventor: Jeffrey La Belle, Tempe, AZ (US)

(73) Assignee: Arizona Board of Regents on behalf of Arizona State University, Scottsdale, AZ (US)

(*) Notice: Subject to any disclaimer, the term of this patent is extended or adjusted under 35 U.S.C. 154(b) by 78 days.

(21) Appl. No.: 15/327,888

(22) PCT Filed: Jul. 24, 2015

(86) PCT No.: PCT/US2015/041901
§ 371 (c)(1),
(2) Date: Jan. 20, 2017

(87) PCT Pub. No.: WO2016/014895
PCT Pub. Date: Jan. 28, 2016

(65) Prior Publication Data
US 2017/0205362 A1 Jul. 20, 2017

Related U.S. Application Data

(60) Provisional application No. 62/029,234, filed on Jul. 25, 2014.

(51) Int. Cl.
*G01N 23/00* (2006.01)
*G01N 23/223* (2006.01)

(52) U.S. Cl.
CPC .................. *G01N 23/223* (2013.01)

(58) Field of Classification Search
CPC .................................................. G01N 23/223
See application file for complete search history.

(56) References Cited

U.S. PATENT DOCUMENTS

| | | | |
|---|---|---|---|
| 2002/0097833 A1* | 7/2002 | Kaiser | G01N 23/223 378/45 |
| 2009/0086901 A1* | 4/2009 | Boyden | A61B 5/415 378/45 |
| 2010/0111252 A1 | 5/2010 | Sommer et al. | |
| 2010/0304491 A1 | 12/2010 | McNeil et al. | |

FOREIGN PATENT DOCUMENTS

| | | |
|---|---|---|
| EP | 1936539 A1 | 6/2008 |
| WO | WO 2013171716 A1 | 11/2013 |

OTHER PUBLICATIONS

International Search Report for Application No. PCT/US2015/041901 dated Oct. 28, 2015.

* cited by examiner

*Primary Examiner* — Dani Fox
(74) *Attorney, Agent, or Firm* — Quarles & Brady

(57) ABSTRACT

A system and method for identifying an object is provided. The system includes an enhanced chemical compound coupled to an object, an X-Ray Fluorescence (XRF) device for scanning the enhanced chemical compound coupled to the object, and a display coupled to the XRF device for displaying the results of the scan of the enhanced chemical compound coupled to the object, the results of the scan including at least one of what kind of object was scanned, the owner of the object, and the manufacturer of the object.

20 Claims, 17 Drawing Sheets

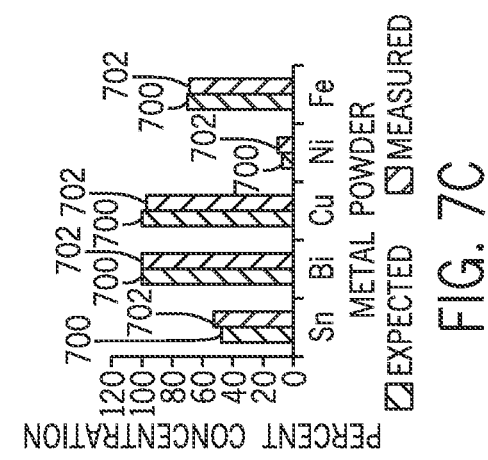
FIG. 7A
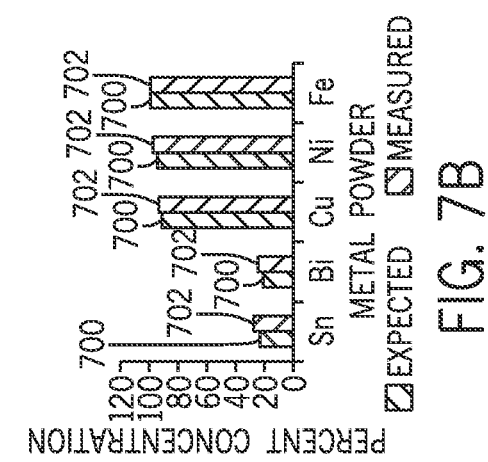
FIG. 7B
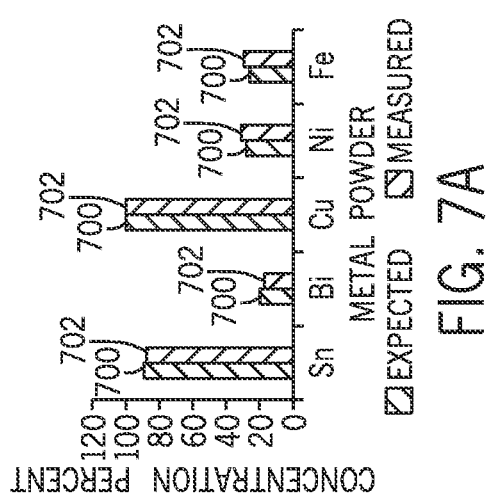
FIG. 7C
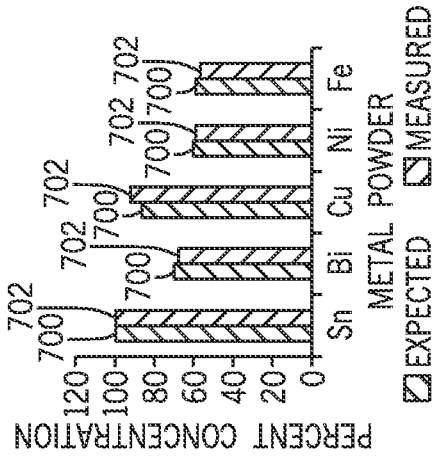
FIG. 7D
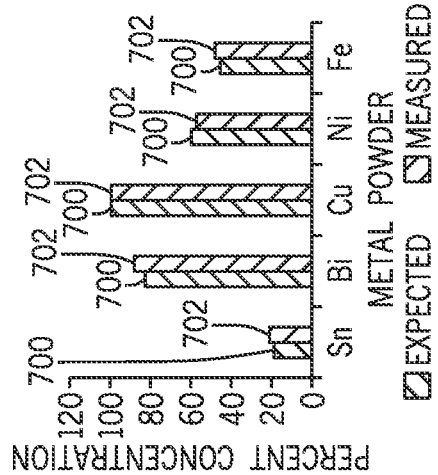
FIG. 7E
FIG. 7F

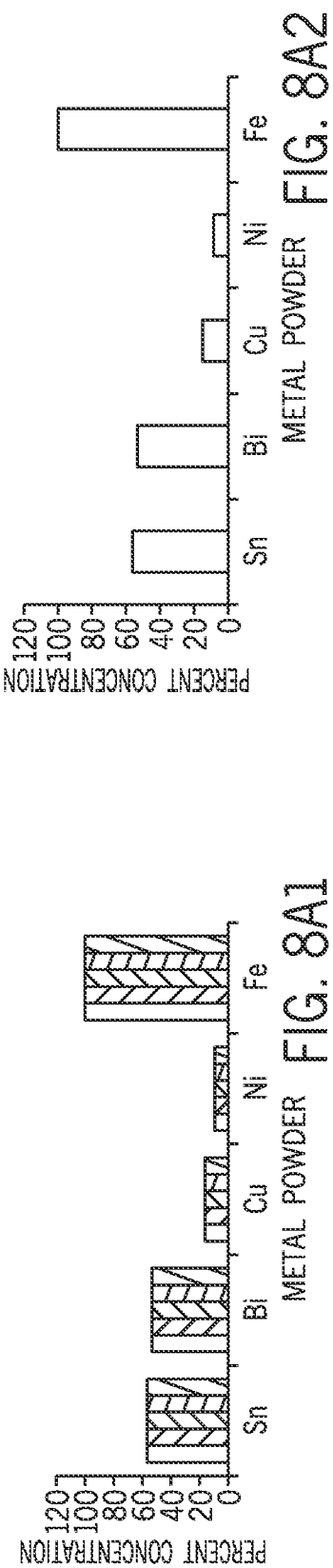
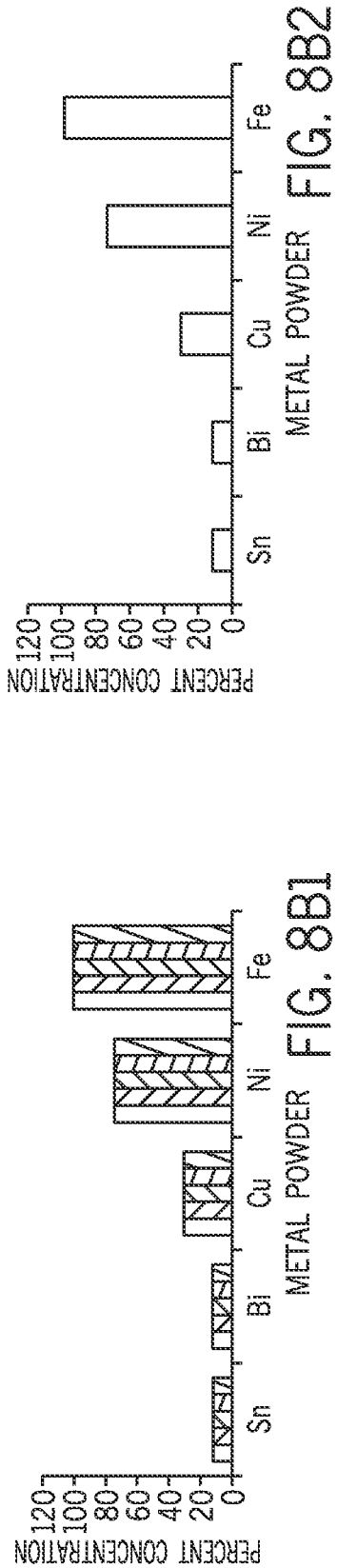
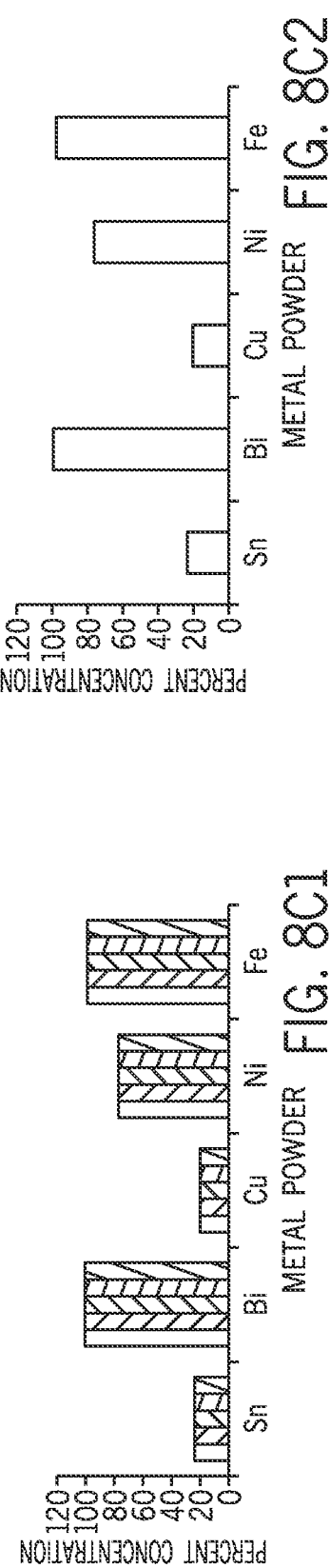

SYSTEM AND METHOD FOR IDENTIFYING AN OBJECT

CROSS-REFERENCE TO RELATED APPLICATIONS

The present application represents the U.S. National Stage of International Application No. PCT/US2015/041901 filed Jul. 24, 2015 which is based on, claims priority to, and incorporates herein by reference in its entirety, U.S. Provisional Patent Application No. 62/029,234, filed on Jul. 25, 2014, and entitled "System And Method For Identifying An Object."

STATEMENT REGARDING FEDERALLY SPONSORED RESEARCH

Not applicable.

BACKGROUND OF THE INVENTION

The field of the invention is identifying objects. More particularly, the invention relates to identifying objects using unique identifier codes and X-ray fluorescence spectroscopy (XRF).

Objects can be identified in a variety of ways and for a variety of purposes. Stores identify goods they sell to consumers using Universal Product Code (UPC) codes. An example of a UPC code 100 can be seen in FIG. 1. Also, criminal investigators identify bullets with a particular gun using the bullet jacket. However, these types of methods cannot always be applied to a particular object.

UPC codes are not useful for identifying whether a particular medical device has been implanted in a person. This may be necessary if a particular medical device has been recalled. Surgery would be required to reveal the device because a code reader cannot read codes subcutaneously. In other words, the UPC code readers can only read in plain sight. Also, criminal investigators would need to actually have the bullet jacket, which rarely occurs in the bulk of instances involving a bullet.

Thus, there is a need for a system and method for identifying objects in a universal fashion, especially when common methods are inadequate or inapplicable.

SUMMARY OF THE INVENTION

The present disclosure overcomes the aforementioned drawbacks by providing a system and method for identifying objects using encoded chemical compounds read by XRF. XRF can be used to read an encoded chemical compound made of different amounts of various chemical elements to produce an object identifier code. Each chemical element represents one number in the object identifier code. Through the use of multiple chemical elements, a larger number of unique object identifier codes can be generated. Objects having these encoded chemical compounds may be identified in a variety of instances using XRF.

In accordance with one aspect of the present disclosure, a method for identifying an object is provided. The method includes labeling the object with an encoded chemical compound. The method further includes scanning the enhanced chemical compound label using XRF. The method also includes producing an object identifier code based on the XRF scan of the enhanced chemical compound label. In addition, the method includes associating the object identifier code to the object.

In accordance with another aspect of the present disclosure, a system for identifying an object is provided. A system includes an enhanced chemical compound coupled to the object. The system also includes an XRF device for scanning the enhanced chemical compound. The system further includes a display coupled to the XRF device for displaying the results of the scan, the results of the scan comprising at least one of what kind of object was scanned, the owner of the object, and the manufacturer of the object.

The foregoing and other aspects and advantages of the disclosure will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

FIG. 7A shows a bar graph displaying XRF scans of an enhanced chemical compound in a medical stapler in accordance with the present disclosure.

FIG. 7B shows a bar graph displaying XRF scans of an enhanced chemical compound in cyanoacrylate glue in accordance with the present disclosure.

FIG. 7C shows a bar graph displaying XRF scans of an enhanced chemical compound in polyurethane glue in accordance with the present disclosure.

FIG. 7D shows a bar graph displaying XRF scans of an enhanced chemical compound in acrylic paint in accordance with the present disclosure.

FIG. 7E shows a bar graph displaying XRF scans of an enhanced chemical compound in thermoplastic elastomer in accordance with the present disclosure.

FIG. 7F shows a bar graph displaying XRF scans of an enhanced chemical compound in PLA thermoplastic in accordance with the present disclosure.

FIG. 8A1 shows a chart displaying the reproducibility of five consecutive measurements of the concentrations in an enhanced chemical compound that has five metals of different concentrations in accordance with the present disclosure.

FIG. 8A2 shows the average of the five consecutive measurements of FIG. 8A1

FIG. 8B1 shows a chart displaying the reproducibility of five consecutive measurements of the concentrations in another enhanced chemical compound that has five metals of different concentrations in accordance with the present disclosure.

FIG. 8B2 shows the average of the five consecutive measurements of FIG. 8B1

FIG. 8C1 shows a chart displaying the reproducibility of five consecutive measurements of the concentrations in yet another enhanced chemical compound that has five metals of different concentrations in accordance with the present disclosure.

FIG. 8C2 shows the average of the five consecutive measurements of FIG. 8C1.

DETAILED DESCRIPTION OF THE INVENTION

An enhanced chemical compound is a mixture of chemical elements that can be read by an XRF spectrometer to produce an object identifier code that is associated with the object or material to which it is attached. In one non-limiting example, the enhanced chemical compound may be a mixture of various metal powders. The enhanced chemical compound may be attached to the object in a unique way, depending on the material of the object and region where the object is placed. The quantities of each of the chemical elements are accurately identified using the XRF spectrometer to produce a unique object identifier code that has the capability to be coupled to various materials and objects. With a wide variety of chemical elements and precise measuring and mixing instruments, the maximum number of unique variations could identify various objects as well as more specific information, as desired. Different methods of creating identifier codes can be used to integrate them into different materials and objects. A wide spectrum of those materials and objects include, but are not limited to, thermoplastics, paints, tapes, and glues.

Figure 2:
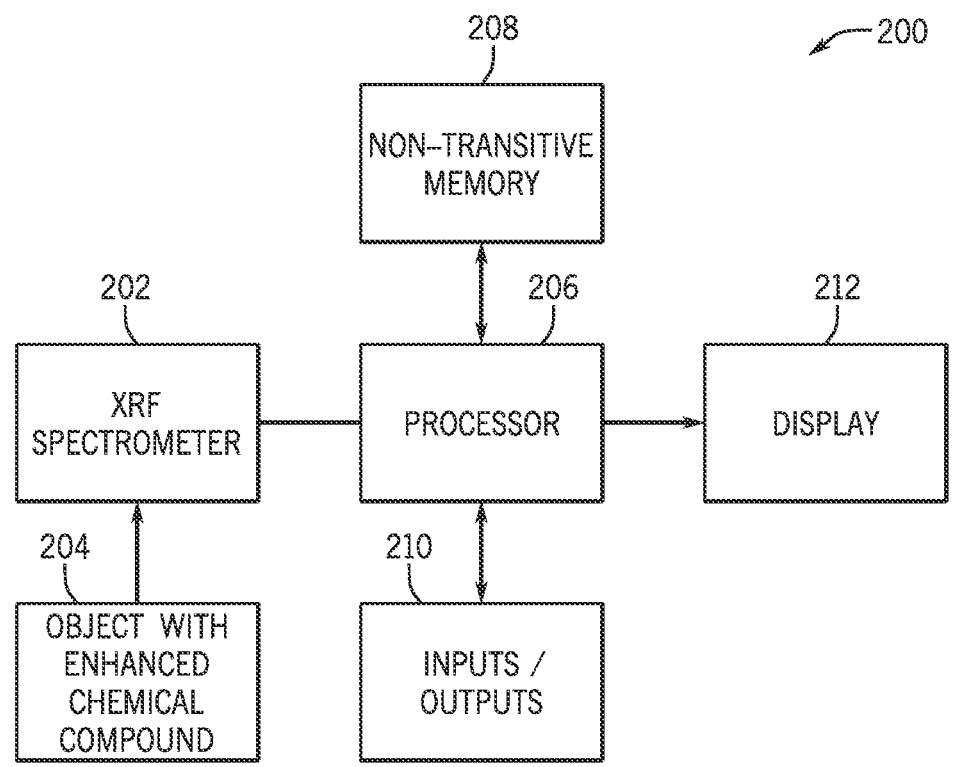
FIG. 2 shows a block diagram of a system in accordance with the present invention.

Referring now to FIG. 2, a system 200 which is able to display, store, and transfer results of an XRF scan is shown. The system 200 includes an XRF spectrometer 202 which is able to scan an object 204 with an enhanced chemical compound, which may include metal concentrations. The scan process may produce a chemical element reading for multiple chemical elements over a complete concentration range. As will be described, the XRF spectrometer 202 may be adapted to generate reports in accordance with the present disclosure or coupled with a system adapted to generate reports in accordance with the present disclosure.

The XRF spectrometer 202 is able to communicate feedback regarding the scan to a processor 206 configured to decode the scan into an object identifier code. The processor 206 may be adapted such that the processor 206 is able to use the object identifier code to identify the object, identify the manufacturer of the object, and/or the owner of the object, etc. The processor 206 is in communication with a non-transitive memory 208 for storing the scan results, which the processor 206 is able to retrieve at a later time. The processor 206 is also configured to communicate with various input/output devices 210 for uploading and downloading the results of various XRF scans and/or XRF scans to be decoded into object identifier codes, etc. The processor 206 is able to communicate the results of the scan or multiple scans to a display 212 for reporting to a user of the system 200. While FIG. 2 shows the components of the system 200 to be separate devices, the system 200 may be contained within a single device that is able to operate in the same or a similar manner as described above.

Figure 3:
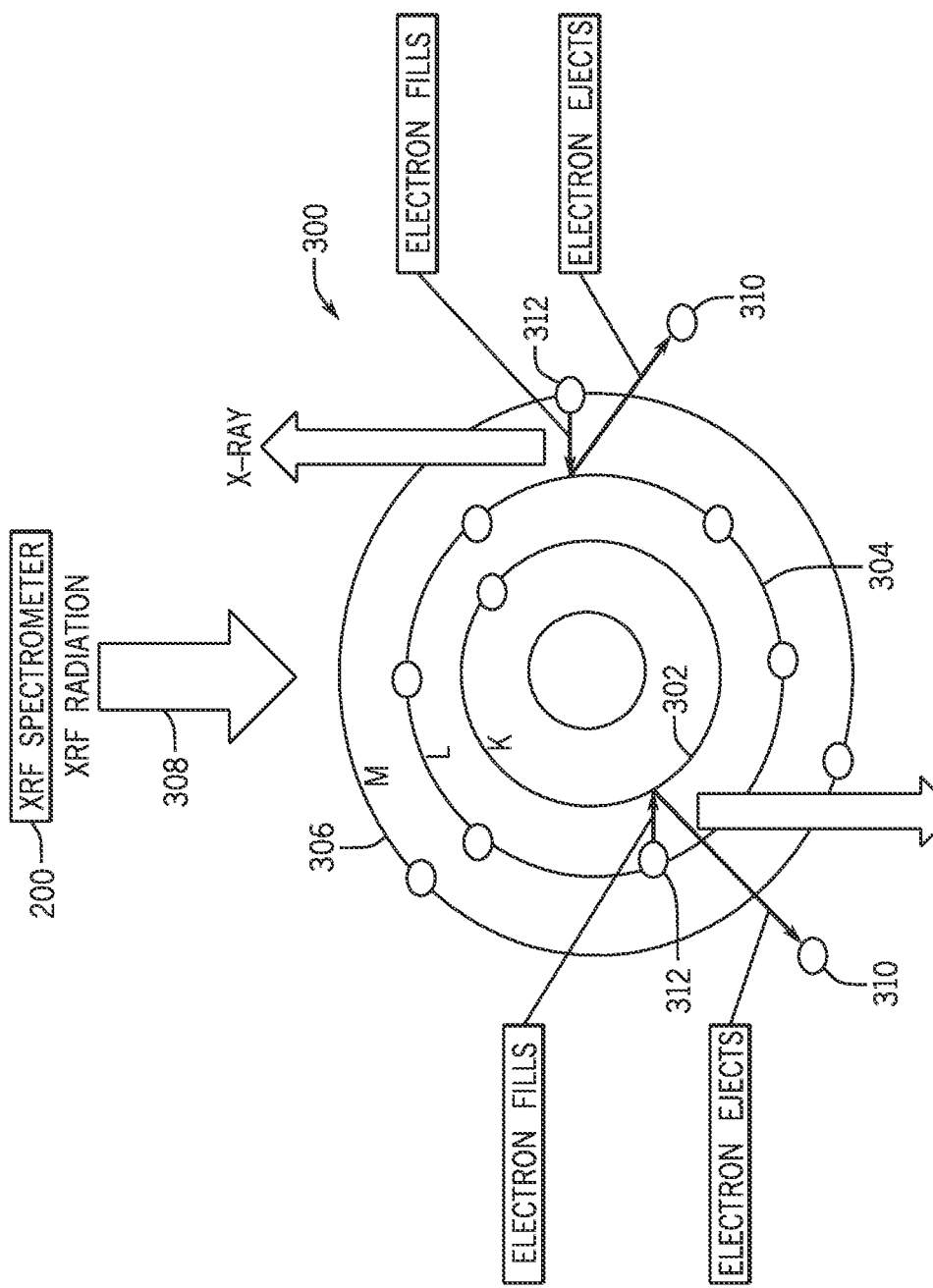
FIG. 3 shows a schematic diagram displaying the energy emission and movement within electron shells due to high energy x-rays.

XRF can affect the behavior of atoms in materials after interacting with radiation emitted during the XRF scan. FIG. 3 depicts the movement of electrons in an atom 300 of a material between electron shells 302, 304, 306 and the resulting movement of unique energy emitted after irradiation by the XRF spectrometer 200. XRF excites a material with high-energy radiation 308 to ionize the material. When there is enough radiation energy, one or more electrons 310 eject from the atom 300. This causes the atom 300 to be unstable and electrons 312 from higher electron shells 304, 306 fall to lower electron shells 302, 304, as shown in FIG. 3. Each chemical element has unique energy levels between electron shells 302, 304, 306 that are distinguishable and read using XRF. The energy between electron shells 302, 304, 306 can dictate an energy of a photon fluoresced upon the electrons 312 falling to lower electron shells 302, 304. Fluorescence indicates that the absorption of radiation with a specific energy renders re-emission of radiation of a different (usually lower) energy. Because chemical elements have electron shells with unique energy levels, XRF has the ability to characterize which chemical elements are present in a sample. In some non-limiting examples, the energy from the K-Shell 302 can be used at its specific energy level (typically measured in kiloelectron volts (keV)); however, in other non-limiting examples, where chemical elements with a higher atomic number than sixty are present, energy from the L-Shell 304 can be used due to the otherwise large amount of energy.

The XRF spectrometer 202 may emit approximately 0.6 millirem/hour (mrem/hr) of direct radiation. Radiation to the operator of the spectrometer can be less than approximately 0.1 mrem/hr compared to the average annual dose of radiation to a person in the United States of 360 mrem and a chest x-ray which exerts 6 mrem. Scanning with the XRF spectrometer 200 is only necessary for reassurance of the identification of a specific device and would not occur often. While the radiation is not desirable, the risk of radiation harm is low compared to the value of knowing exactly what device is implanted in order to avoid unnecessary surgery. In some non-limiting examples, XRF scans may take five to ten seconds for accurate readings. It is to be appreciated that XRF technology developed in the future may emit less radiation and take a fraction of the time is included within the scope of the present disclosure. In one non-limiting example, the XRF spectrometer 202 may use a ring-shaped semiconductor drift detector to cut the scan time to 150 ns-450 ns depending on the resolution of the scan. Using XRF to measure enhanced chemical compounds provides a convenient scanning device, a large capacity of object identifier codes and accurate, reproducible data on a small scan size with the capability to integrate into various devices and materials at subcutaneous depths.

In one non-limiting example, object identifier codes can be made by measuring specific quantities of chemical elements that can combine to form an enhanced chemical compound. For example, the chemical elements may be metal powders including Zinc, Aluminum, Chromium, Bismuth, Tin, Copper, Vanadium, Manganese, Nickel, and Iron Powder. In one non-limiting example, the average total amount of the chemical elements in the enhanced chemical compound can be approximately 0.5 grams. In other non-limiting examples, the average total amount of the chemical elements in the enhanced chemical compound may be more or less than approximately 0.5 grams. The enhanced chemical compound may be mixed in various concentrations and then scanned using the XRF spectrometer 202. Data from the XRF spectrometer 202 scan may be analyzed by a software program which is configured to provide a breakdown of percentages of the metals present in the scanned enhanced chemical compound.

Figure 4B:
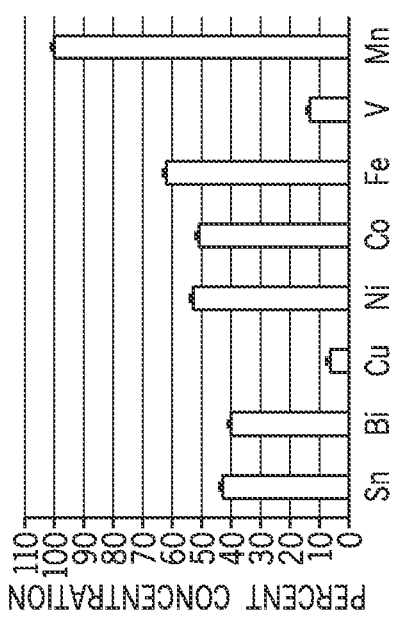
FIG. 4B shows a chart displaying of the concentrations from the sample data of FIG. 4A.
Figure 4C:
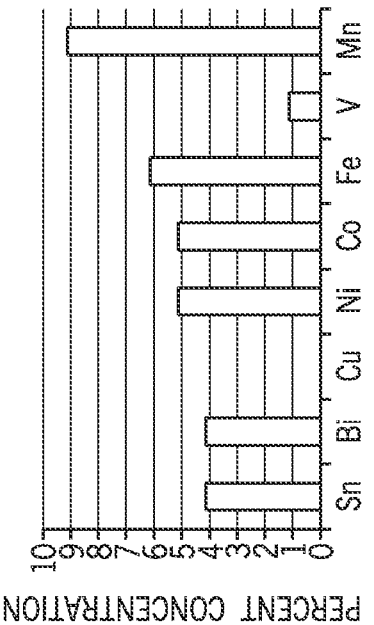
FIG. 4C shows a chart displaying rounded concentrations of the concentration of FIG. 4B.
Figure 4A:
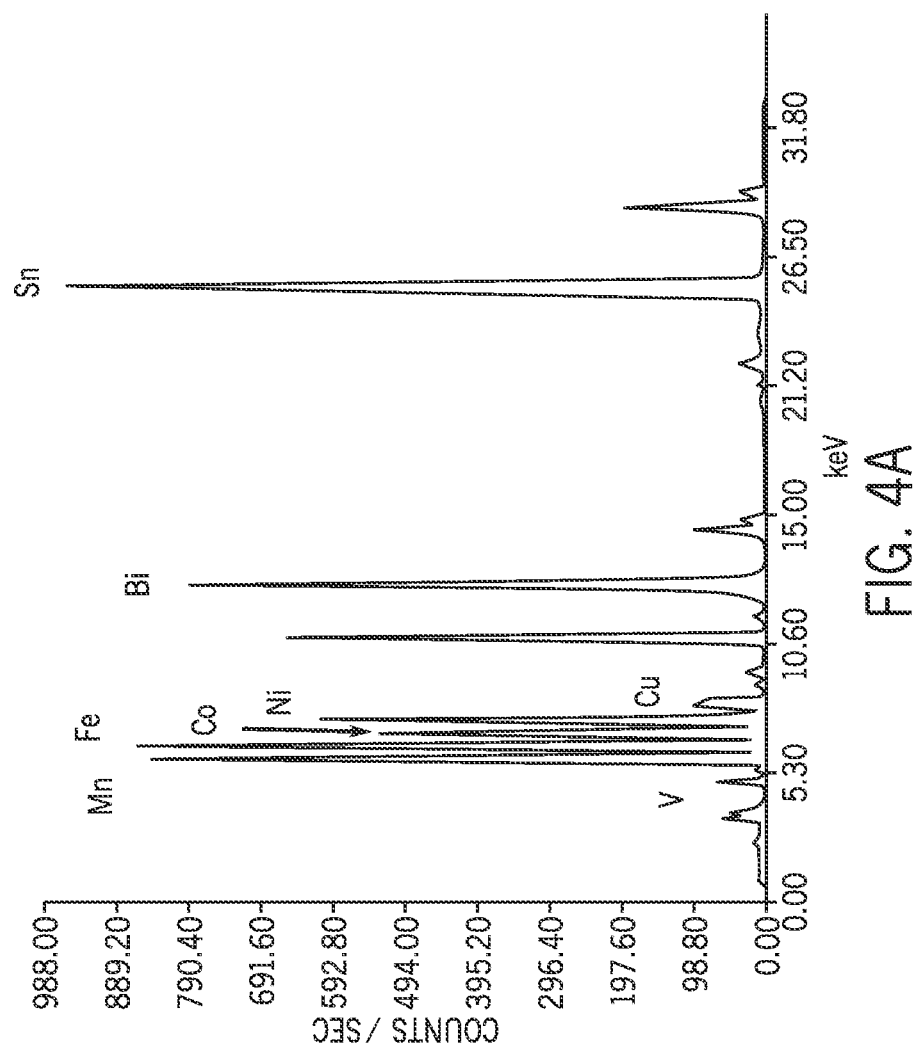
FIG. 4A shows a graph displaying sample data from an XRF scan in accordance with the present disclosure.

As described above, in one non-limiting example, an object identifier code can be constructed from the amounts and types of chemical elements in the enhanced chemical compound. FIGS. 4A-4C illustrate one non-limiting example of how raw data can be transformed into an object identifier code. In particular, FIG. 4A shows raw data obtained from a scan with the XRF spectrometer 202 of one non-limiting example of an enhanced chemical compound. After the enhanced chemical compound is scanned, the percentage of each of the chemical elements can be read and recorded. In this non-limiting example of generating an object identifier code, the chemical element with the highest percentage as a normalizer to the rest of the chemical elements and is set to 100% as shown in FIG. 4B. The enhanced chemical compound percentages for the chemical elements may be rounded to the nearest five percent except for any number under 1% may be read as error due to the scanner. For example, as shown in FIG. 4C, a reading more than one and less than ten can be rounded to five and count as a zero, and a number greater than ten and less than twenty can be rounded to 15 and count as a one, and so on. Each number is connected with the chemical abbreviation that number represents. In this way, the order of the object identifier code may not be important because each number is preceded by the chemical abbreviation that it represents. The resulting object identifier code based on the scan with the XRF spectrometer 202 may then be used to identify the object or material to which it is applied. For example, the object identifier code for the example XRF scan with the XRF spectrometer 202 of FIGS. 4A-4C can be Sn4Bi4Cu0Ni5Co5Fe6V1. Thus, with ten metals and ten levels per metal, a ten digit decimal code is available.

Figure 5:
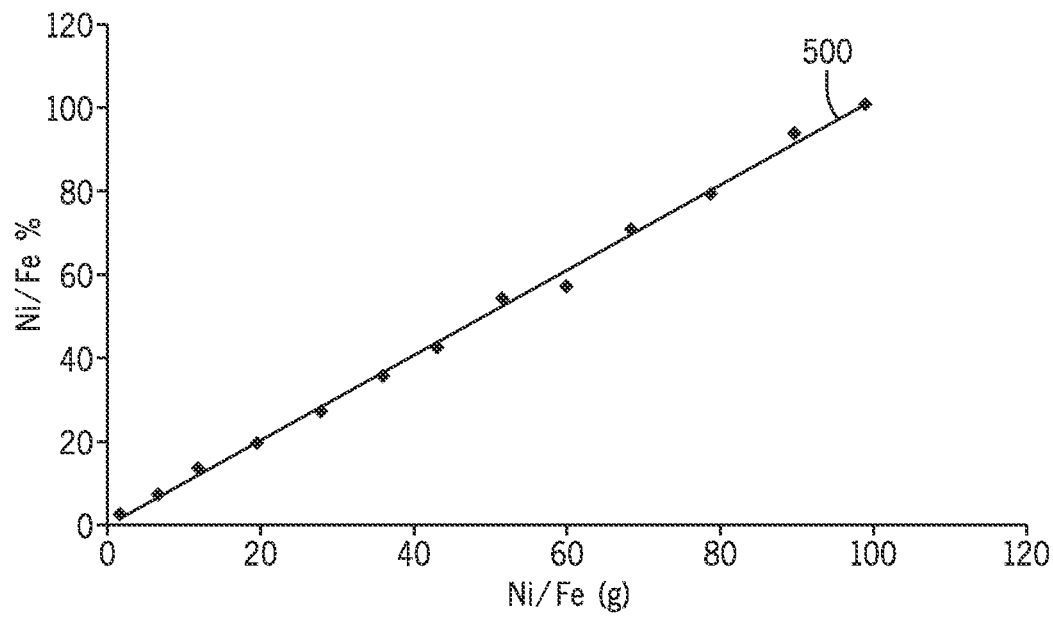
FIG. 5 shows a chart displaying the level of resolution taken by recording the concentration of nickel dived by the concentration of iron in accordance with the present disclosure.

The accuracy of the object identifier code can typically be less than approximately 1% error. This is supported by FIG. 5 which illustrates the estimated outcome of two metal powder percentages compared to the experimental value in grams (g). The standard deviation of the resolution was calculated to be 1.99%. This can allow for unique object identifier codes at every ten percent of the maximum elemental reading. Error bars were not necessary in FIG. 5 since they were similar thickness to of line 500. In some non-limiting examples, techniques such as sputtering or other enhanced mixing techniques may be implemented to improve the reading accuracy. The results illustrated in FIG. 5 can support a standard deviation of under 0.8 percent when measuring concentration. Based on those results, six standard deviations would be under five percent, thus providing six sigma quality or a probability of error of less than two parts per billion.

Figure 6:
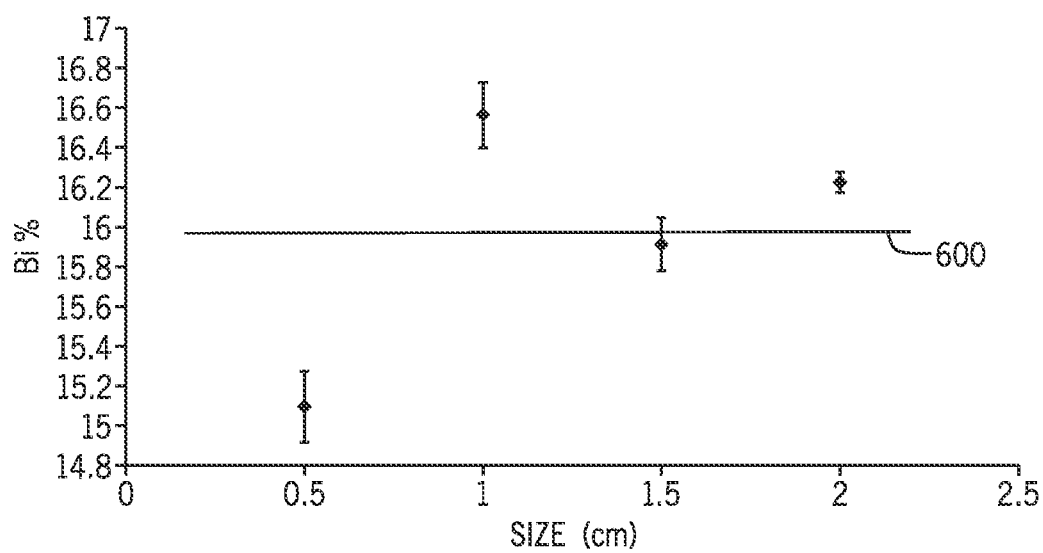
FIG. 6 shows a chart displaying spot size represented by circular enhanced chemical compounds in increasing size with the average amount represented by a line at 15.97 percent in accordance with the present disclosure.

The size of the physical an enhanced chemical compound can be important to the accuracy of the readings and the potential for enhanced chemical compounds to be used on small objects. The XRF spectrometer 202 may have a high-resolution spot size of 0.8 centimeters (cm) in diameter. FIG. 6 shows a chart illustrating the influence of the size of the enhanced chemical compound on the resolution of bismuth readings. To produce the data shown in FIG. 6, a single metal powder mixture was scanned with an initial circular diameter of 2 cm and reduced by 0.5 cm, down to a minimum diameter of 0.5 cm. As shown in FIG. 6, the standard deviation increases with decreasing spot size. The standard deviation increases by 0.125% when spot size decreases from 2 cm to 0.5 cm. The total average amount of the bismuth is represented by line 600 at 15.97 percent. The total difference was 0.8% of the primary metal component between the 2 cm diameter and 0.5 cm diameter enhanced chemical compounds. This signifies that when scanning the enhanced chemical compound directly, it can be reduced to 0.5 cm in diameter. Based on the results of FIG. 6, scanning a 0.25 cm diameter enhanced chemical compound may result in a large amount of error due to background noise. However, it should be appreciated that XRF technology developed in the future may reduce the size of the enhanced chemical compound that can be scanned and produce acceptable results. Furthermore, the size of the enhanced chemical compound is not meant to be limiting in any way to the scope of the present disclosure. An accurate reading of a 0.5 cm diameter (0.196 $cm^2$ surface area) object identifier code would allow small objects to be identified. In comparison, the average UPC code has a surface area of 3.73 $cm^2$.

In one non-limiting example, Thermo Plastic Elastomer (TPE) was used to simulate skin due to its texture and physical qualities. Object identifier codes of enhanced chemical compounds were analyzed through TPE of 0.3 cm thickness. The average human's skin depth is 0.2 cm. Thus, enhanced chemical compounds can be used to provide subcutaneous identification of object identifier codes.

FIGS. 7A-7F illustrate another non-limiting example where various successful readings of enhanced chemical compounds with different applications. In particular, enhanced chemical compounds were successfully used to identify an object identification code in a medical stapler (FIG. 7A), cyanoacrylate glue (FIG. 7B), polyurethane glue (FIG. 7C), acrylic paint (FIG. 7D), TPE (FIG. 7E), and PLA thermoplastic (FIG. 7F). In FIGS. 7A-7F, the left bars 700 above each element symbol are the expected values, and the right bars 702 above each element symbol are the scanned values. Error bars on the column charts illustrated in FIGS. 7A-7F were approximately the thickness of the line illustrating the successful identification of an object identifier code via scanning an enhanced chemical compound with the XRF spectrometer 202 in the different applications, described above. It should be know that enhanced chemical compounds can be integrated into in different types of medical devices to identify an objection identifier code. For example, enhanced chemical compounds were successfully tested on medical devices that were made up of plastic, metal, and plastic/metal combinations. This shows the possibilities of applications for insertion onto various medical devices.

Figure 1:
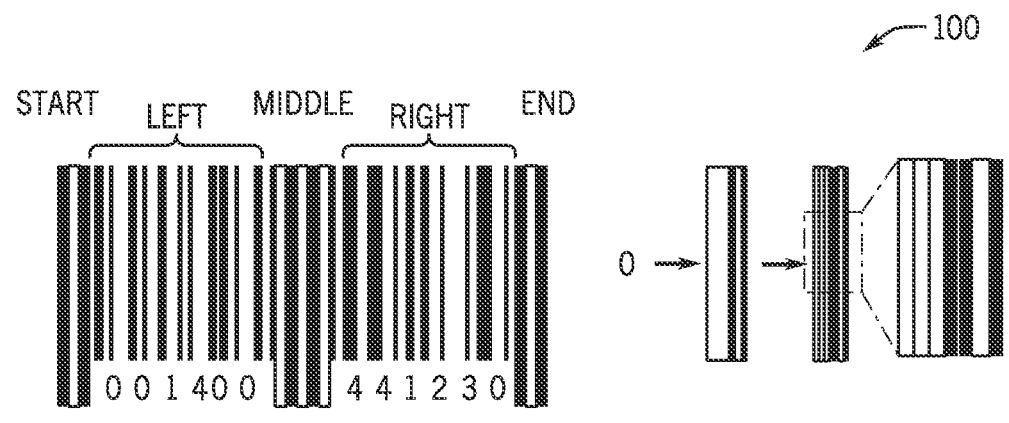
FIG. 1 shows an example of a traditional UPC code.

FIG. 8A1-8C2 shows the reproducibility of three different non-limiting examples of an enhanced chemical compound that consist of five metals each. FIG. 8A1 illustrates the results of five consecutive scans of the same enhanced chemical compound, and FIG. 8A2 illustrates the average results of the five consecutive scans. The same applies to FIGS. 8B1 and 8B2, and FIGS. 8C1 and 8C1. The results shown in FIGS. 8A1-8C2 support the readings have an average standard deviation of 0.22%. Error bars are approximately the thickness of the line. FIGS. 8A1-8C2 support that reproducibility levels at +/−5% concentration can be achieved. Reproducibility levels at +/−5% concentration can produce ten million unique object identifier codes using eight types of chemicals in an enhanced chemical compound. As would be recognized by one of skill in the art, an increased number of chemical elements and/or more precise measuring and mixing methods may increase the total number of unique object identifier codes available.

It should be known that the metal components in the medical device may be read by the XRF spectrometer 202 and produce interference when scanning the enhanced chemical compound. To avoid such interference, the metals in that device would not also be in the enhanced chemical compound on that device. The interference metals that are incorporated in the medical device would be removed from the enhanced chemical compound, and the remaining metals that are in the enhanced chemical compound would then be divided by the amount of the most used metal to create an object identifier code, as described above.

It should also be known that the homogeneity of the enhanced chemical compound can adversely affect the accuracy in which the XRF spectrometer 202 reads the enhanced chemical compound. Thus, the enhanced chemical compound should be mixed thoroughly to ensure a homogenous distribution of the chemical elements throughout enhanced chemical compound.

In another non-limiting example, error detection and correction code by using parity bits may further reduce the probability of misidentification of the object identifier code.

Figure 9:
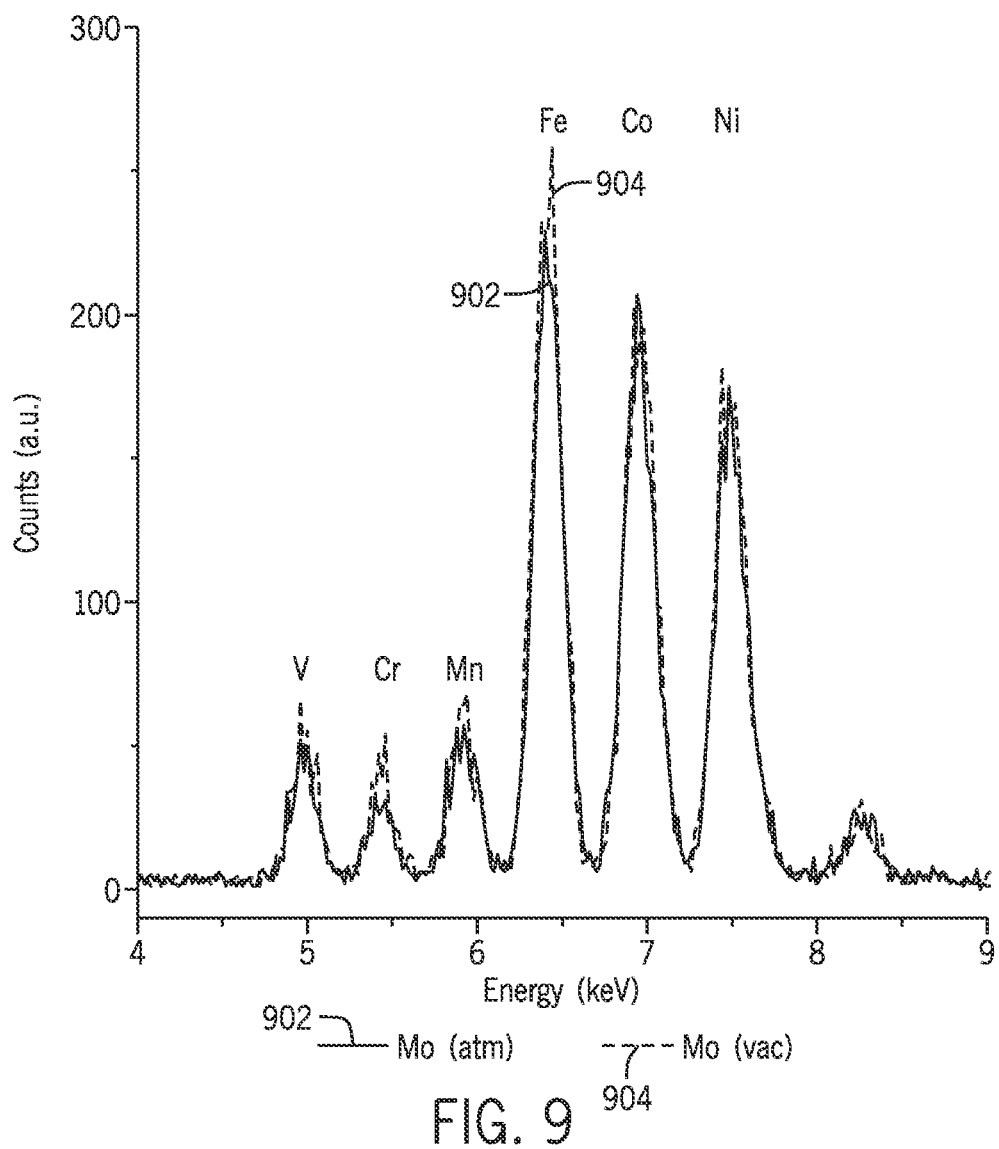
FIG. 9 shows a chart displaying the difference between performing XRF in atmosphere vs. in a vacuum in accordance with the present disclosure.
Figure 10:
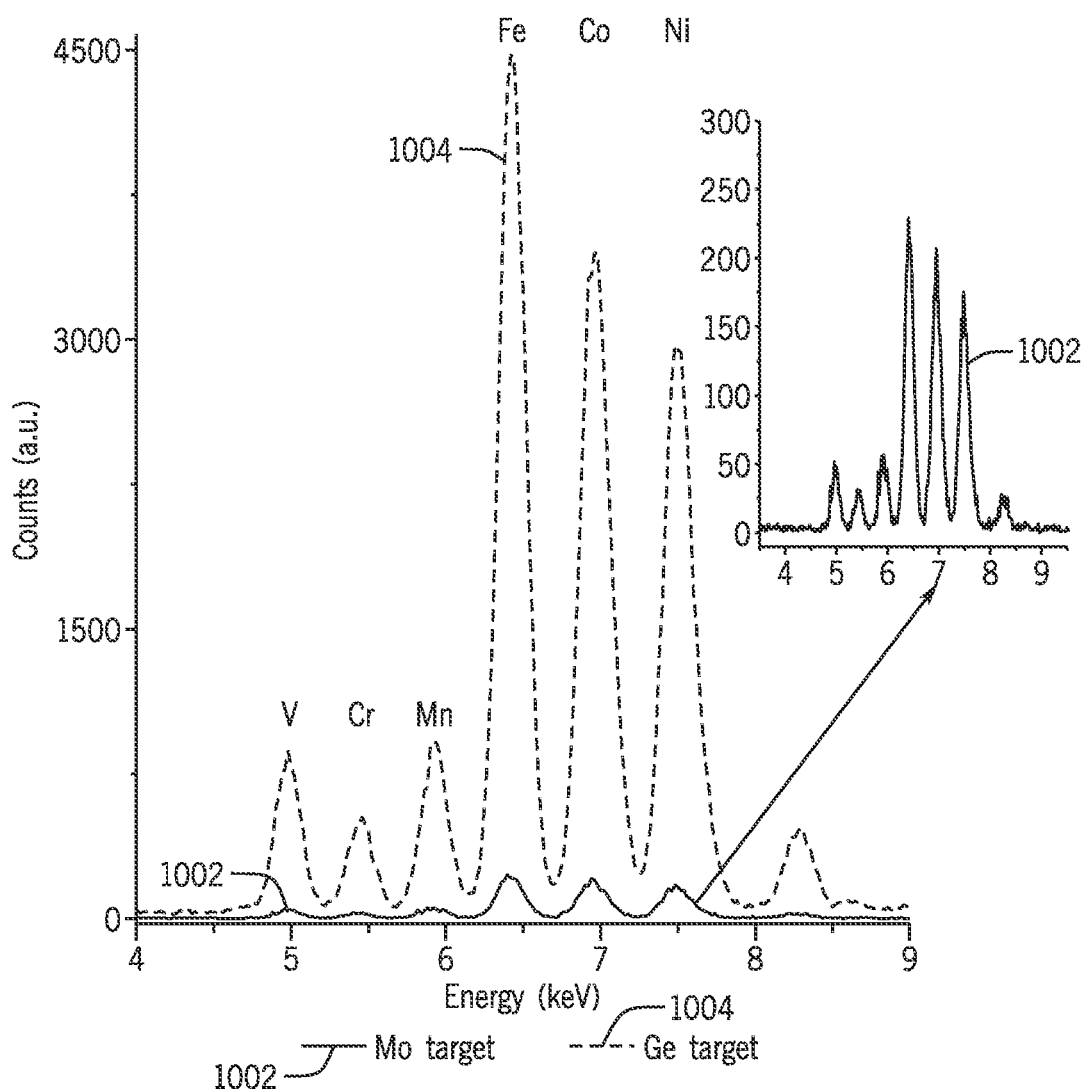
FIG. 10 shows a chart displaying the difference between performing XRF on a molybdenum target vs. a germanium target in accordance with the present disclosure.
Figure 11A:
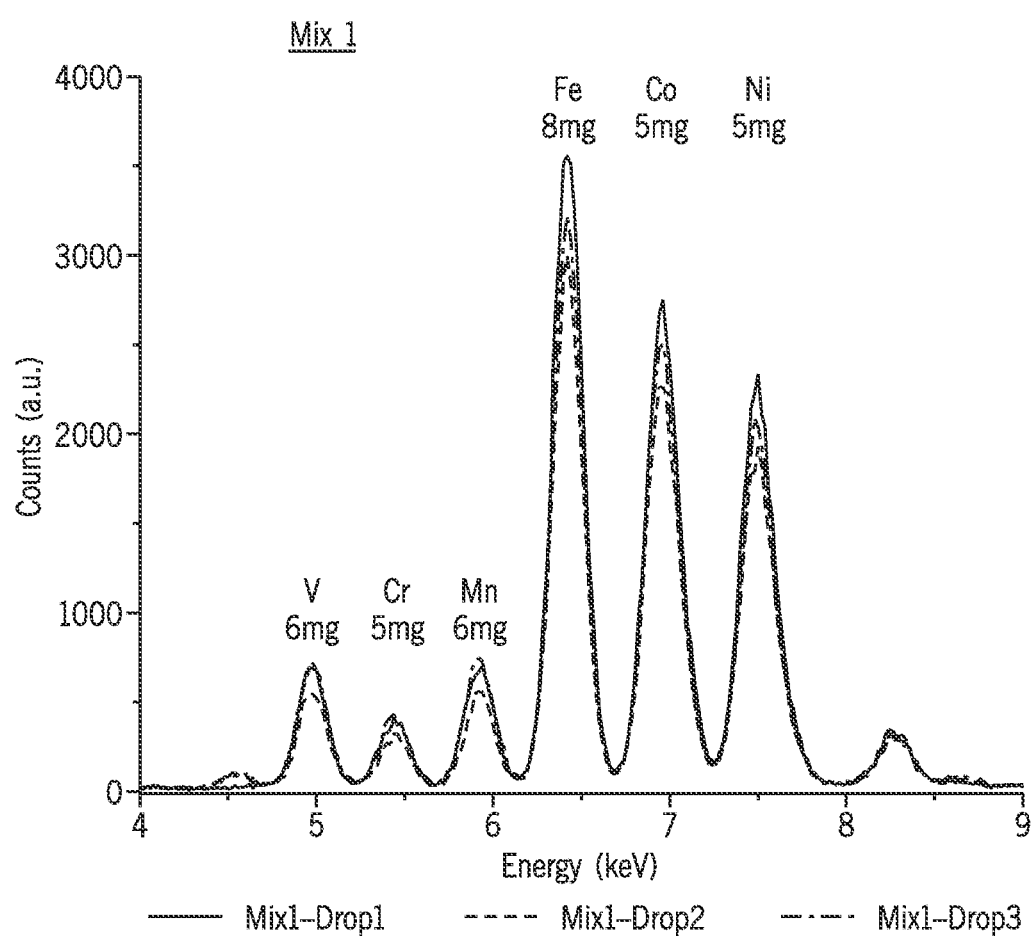
FIG. 11A shows a chart displaying the drop-to-drop reproducibility of XRF for a first mix of an enhanced chemical compound in accordance with the present disclosure.
Figure 11B:
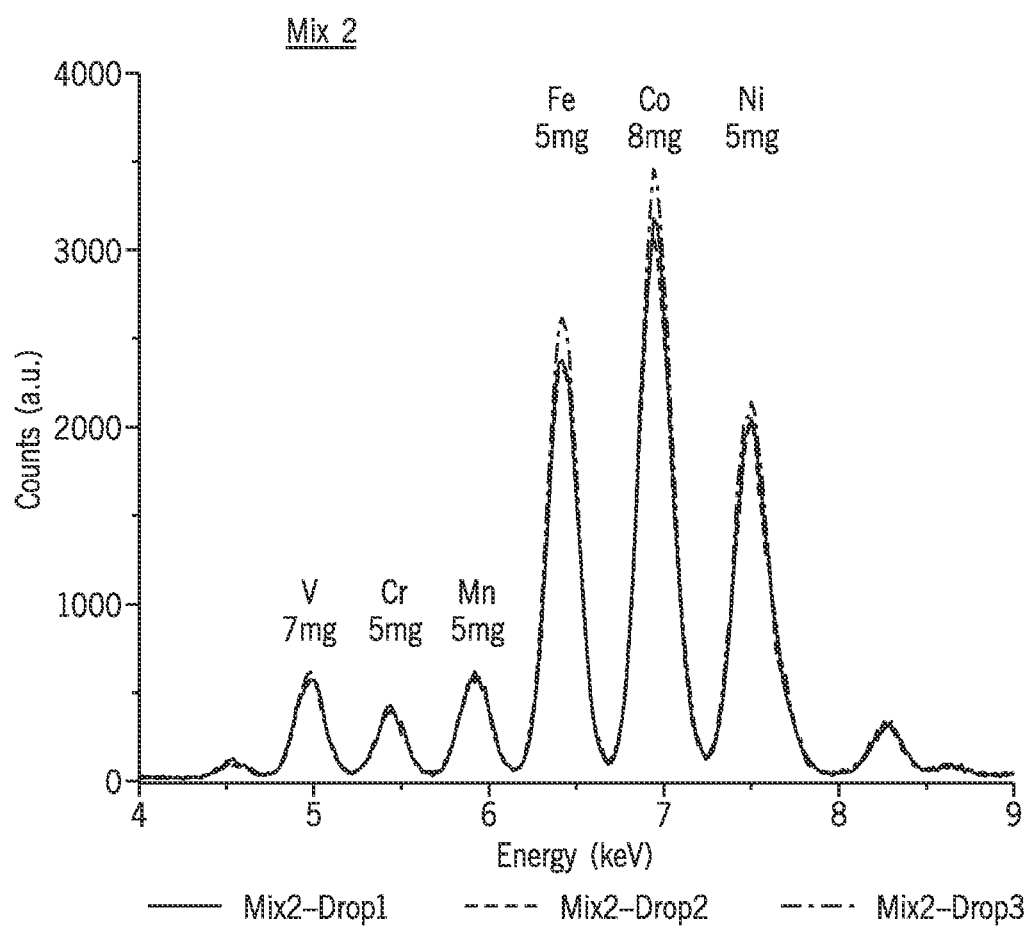
FIG. 11B shows a chart displaying the drop-to-drop reproducibility of XRF for a second mix of an enhanced chemical compound in accordance with the present disclosure.
Figure 11C:
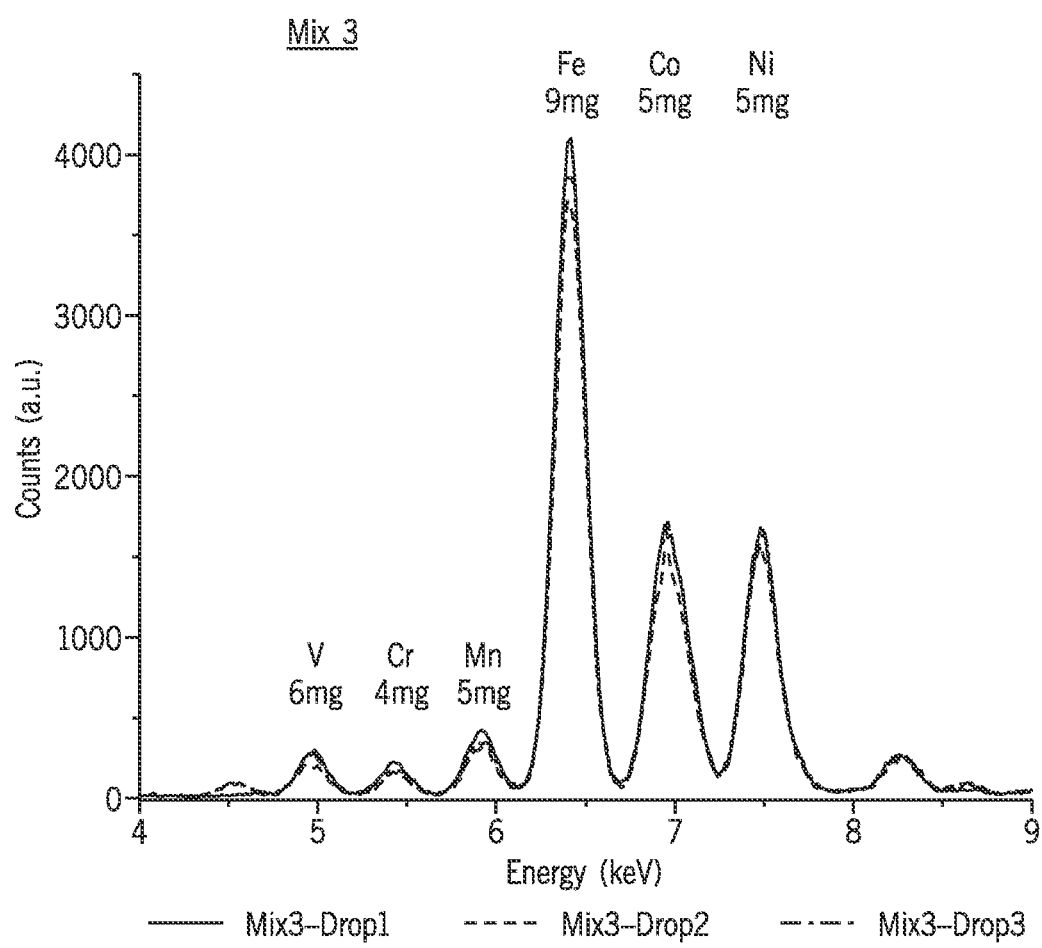
FIG. 11C shows a chart displaying the drop-to-drop reproducibility of XRF for a third mix of an enhanced chemical compound in accordance with the present disclosure.
Figure 11D:
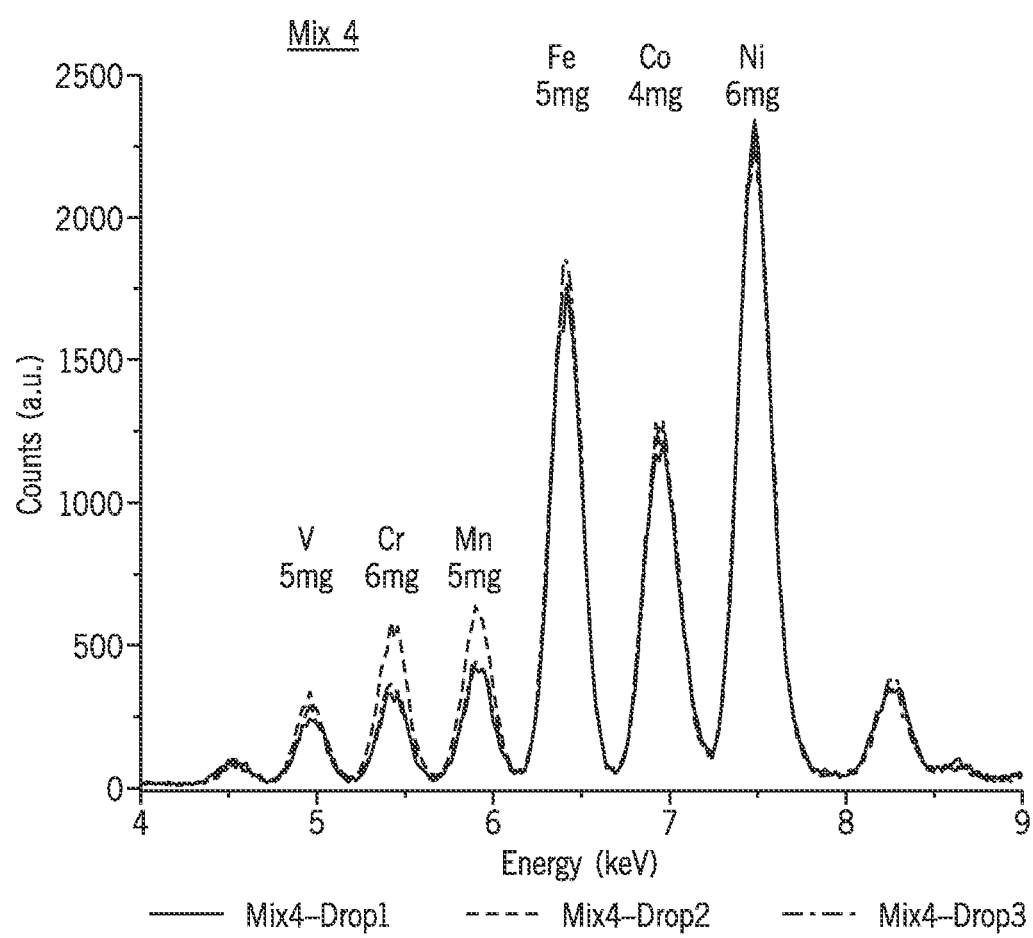
FIG. 11D shows a chart displaying the drop-to-drop reproducibility of XRF for a fourth mix of an enhanced chemical compound in accordance with the present disclosure.
Figure 11E:
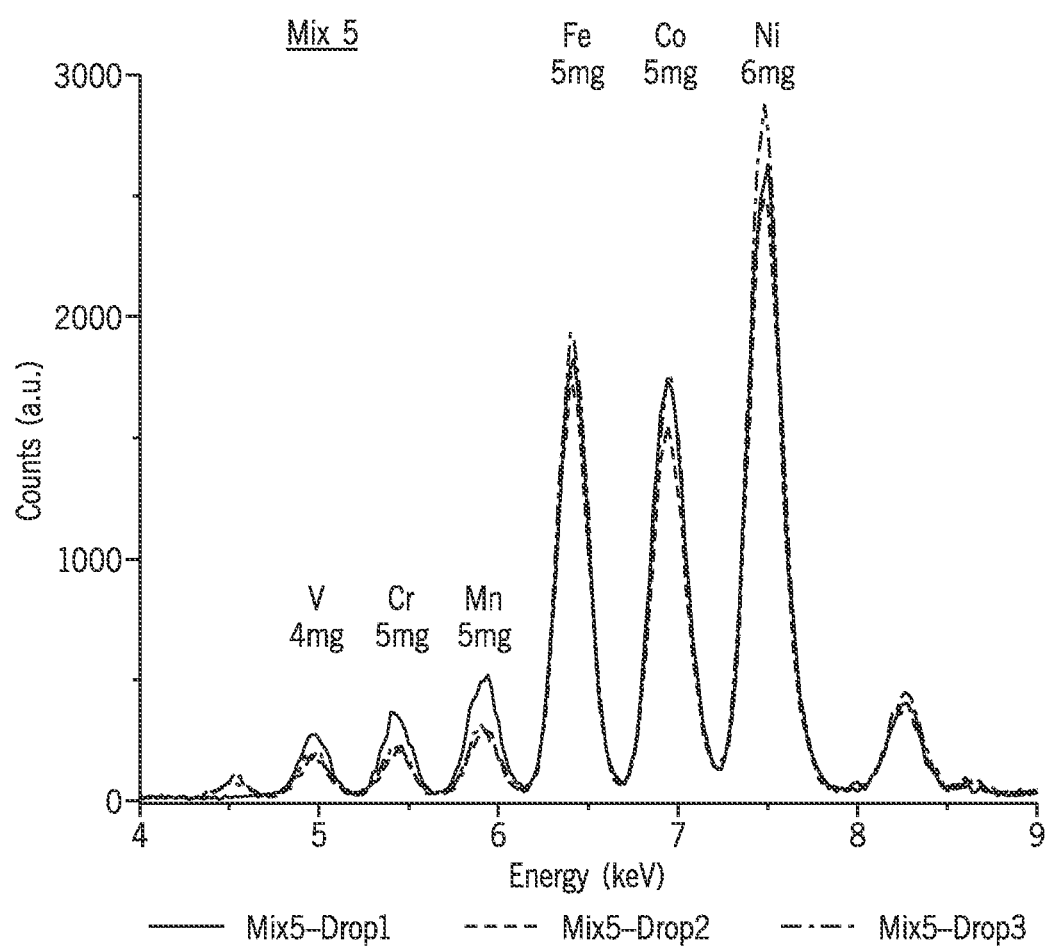
FIG. 11E shows a chart displaying the drop-to-drop reproducibility of XRF for a fifth mix of an enhanced chemical compound in accordance with the present disclosure.

FIG. 9 compares performing XRF in atmosphere 902 vs. in a vacuum 904 on an molybdenum target is shown. As can be seen in FIG. 9, there is not a significant difference between the two graphs 902, 904. FIG. 10 illustrates the difference between performing XRF on a molybdenum (Mo) target 1002 vs. a germanium (Ge) target 1004. As can be seen in FIG. 10, there can be an approximately 20-fold increase in signal with the use of germanium as a target instead of molybdenum. Therefore, the germanium target can provide a better signal/noise ratio with better control of peak intensities and identification. FIGS. 11A-E illustrate the results for three different scans of a drop of five different non-limiting examples of an enhanced chemical compound (identified as Mix 1, Mix2, etc. in FIGS. 11A-E). As can be seen FIGS. 11A-E, XRF scans do not show much deviation from drop to drop within a mixture.

Figure 12:
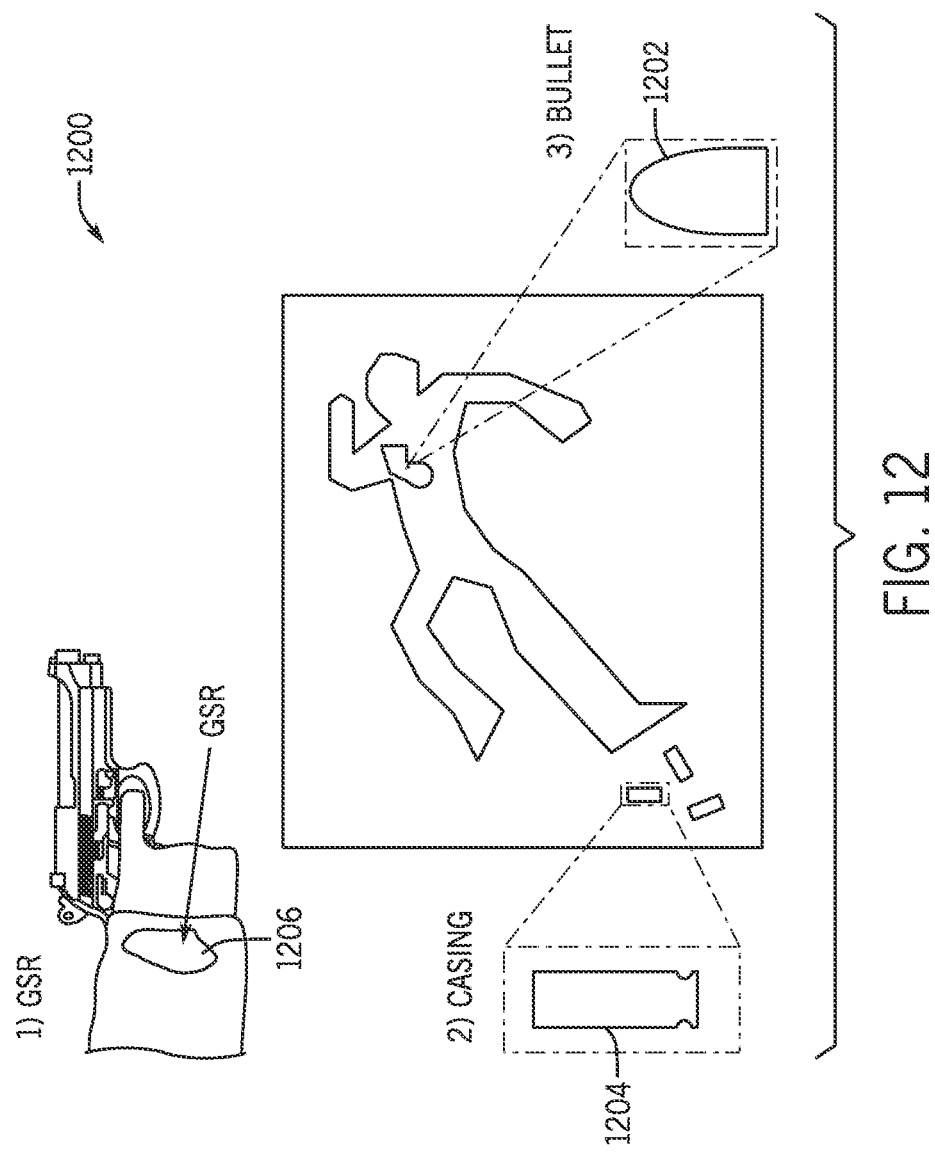
FIG. 12 shows an example of the use of object identifier codes in connection with bullets in accordance with the present disclosure.

FIG. 12 illustrates one non-limiting example of the use of enhanced chemical compounds in connection with an event 1200 involving a bullet 1202. In this non-limiting example, instead of relying on the outer casement 1204 of the bullet 1202 for identification (common practice in the art), the entire bullet 1202 (bullet 1202 and casing 1204) or the gun power residue 1206 released when firing the bullet 1202 may be used as an object identifier code that may be read by XRF. The approach allows for the incorporation of various combinations of different chemical elements to establish an enhanced chemical compound having a unique signature (i.e., object identifier code) by the manufacturer and within the production line of the manufacturer. The enhanced chemical compound can be read by XRF for example using the system 200 described above, which is non-destructive. That is, the scanning of the bullet 1202 and/or the gun shot residue 1206 with the XRF spectrometer 202 would not physically or chemically alter the bullet 1202 and/or the gun shot residue 1206. The enhanced chemical compound can be applied to the bullet 1202 and/or the casing 1204 in two ways: (1) included during fabrication of all components or (2) externally coating bullet components, during or after manufacture and/or before sale. In addition to identifying the manufacturer, the ability to identify within lots will increase the power of this technology. Conceivably, enhanced chemical compounds would be specific to a manufacturer, so that manufacturers that contribute to bullet assembly would also be easily identifiable.

This technology may assist with the forensic identification of bullets and their components post-event in a non-destructive manner, without relying on the presence of a specific component (bullet casement 1204). In addition, complicated crime scenes will be more easily decipherable using the enhanced chemical compounds. This may dramatically reduce effort for crime investigators and law enforcement agencies, which would decrease time to arrest, increase investigations pursued, increase successful conviction rates, decrease wrongful arrests, and ultimately increase safety immediately on a local scale.

Figure 13A:
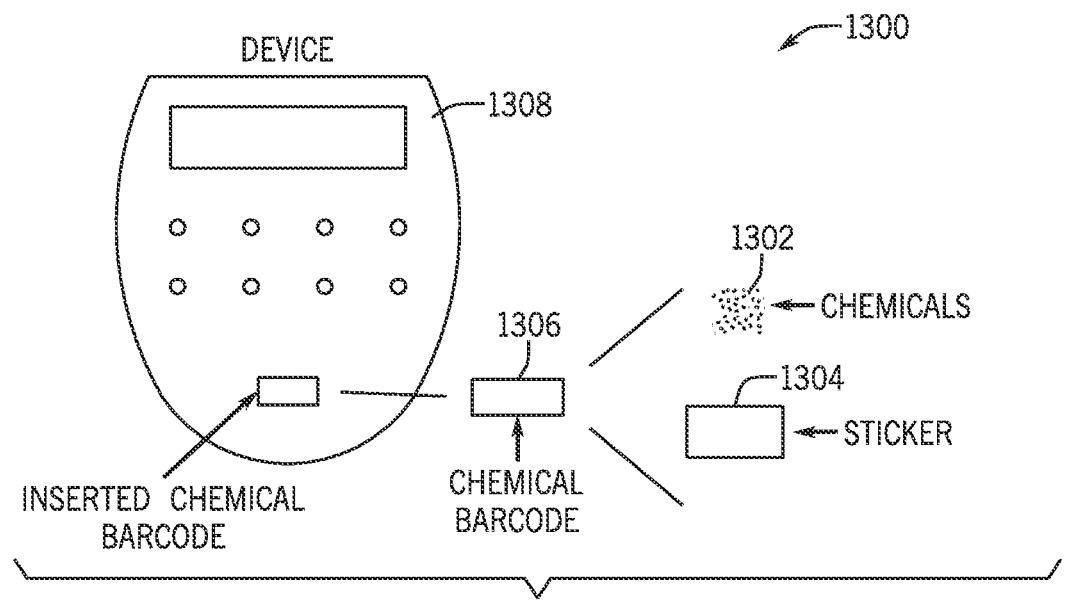
FIG. 13A shows an example of the use of object identifier codes integrated into a sticker and applied to a medical device in accordance with the present disclosure.
Figure 13B:
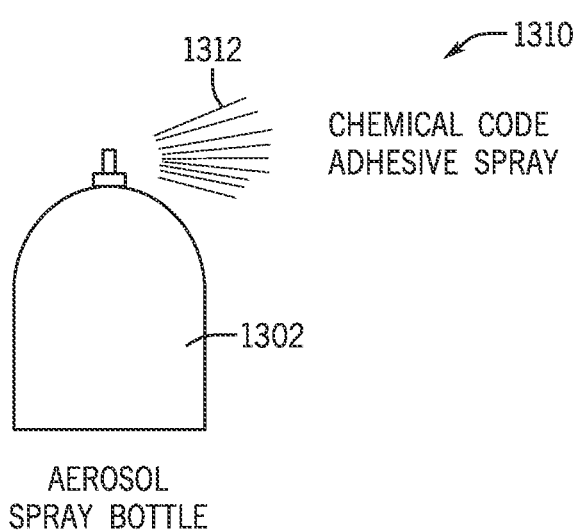
FIG. 13B shows an example of the use of object identifier codes integrated into an aerosol spray in accordance with the present disclosure.
Figure 13C:
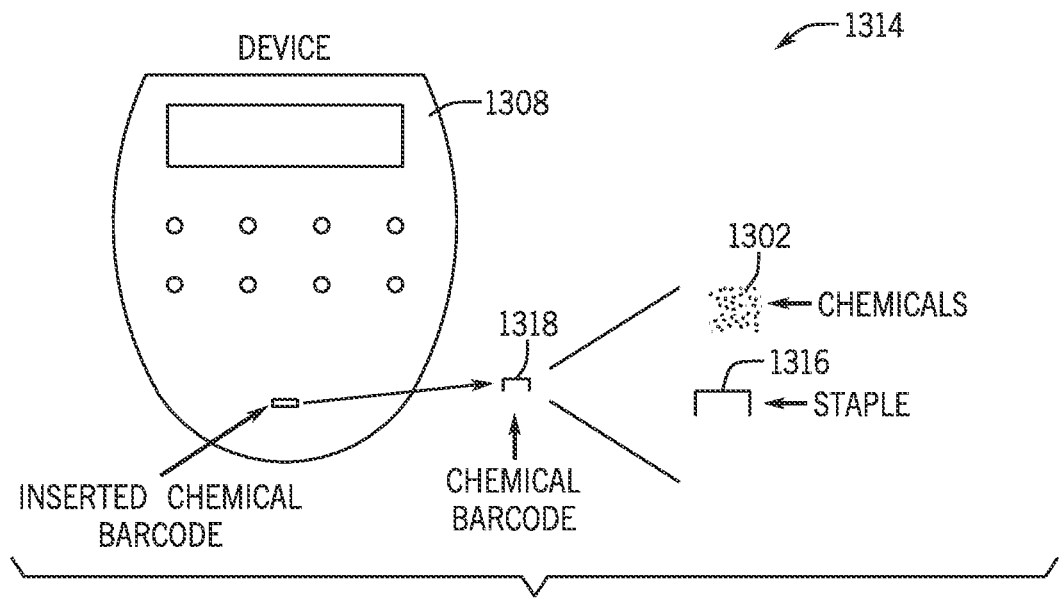
FIG. 13C shows an example of the use of object identifier codes integrated into a staple and applied to a medical device in accordance with the present disclosure.
Figure 13D:
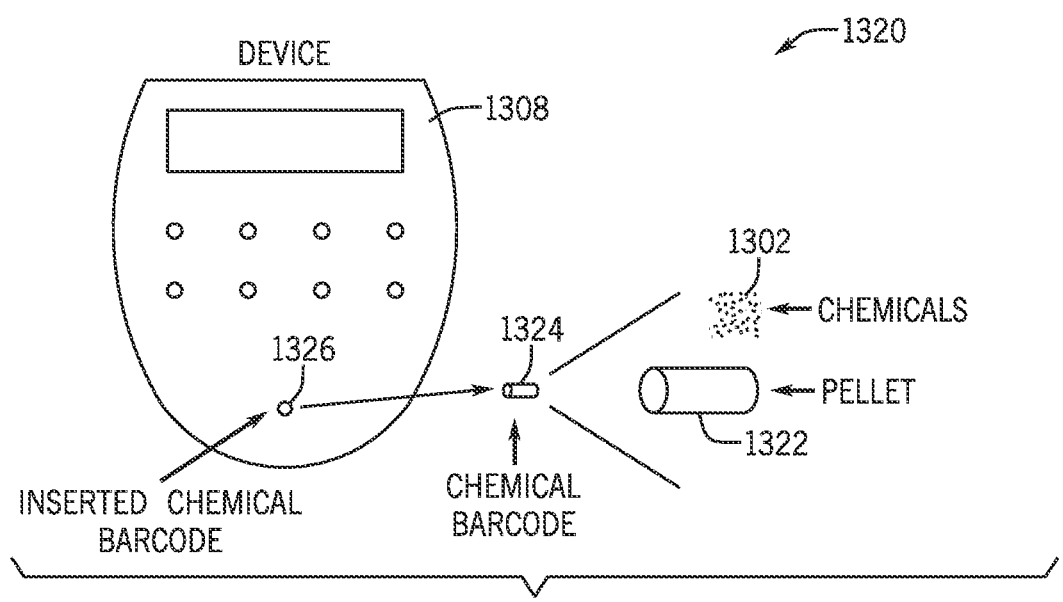
FIG. 13D shows an example of the use of object identifier codes integrated into a pellet and applied to a medical device in accordance with the present disclosure.
Figure 13E:
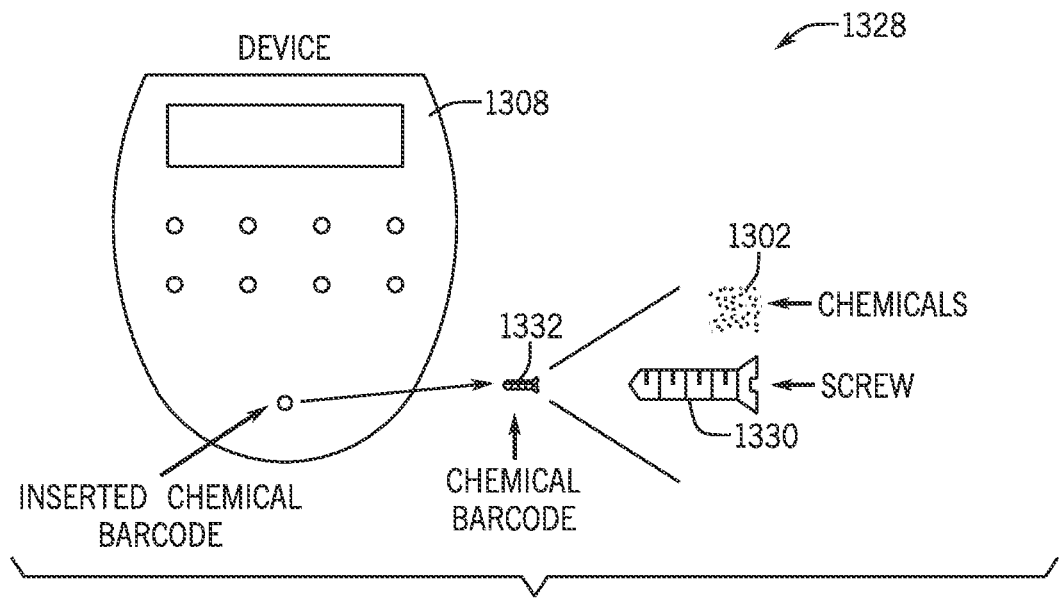
FIG. 13E shows an example of the use of object identifier codes integrated into a screw and applied to a medical device in accordance with the present disclosure.
Figure 13F:
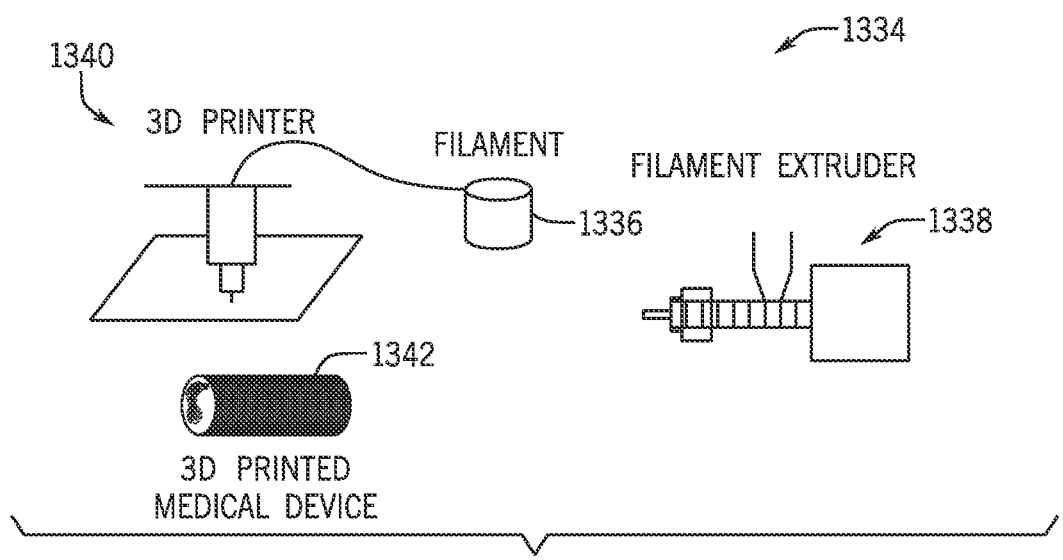
FIG. 13F shows an example of the use of object identifier codes integrated into a 3-D printer in accordance with the present disclosure.

FIGS. 13A-F show six non-limiting configurations of applying an enhanced chemical compound to a medical device. The enhanced chemical compound as applied acts as a chemical barcode to create an object identifier code. FIG. 13A shows a first non-limiting configuration 1300 where the enhanced chemical compound 1302 may be applied to a sticker 1304 to create a chemical barcode 1306 that can be placed upon the device 1308. FIG. 13B shows a second non-limiting configuration 1310 where the enhanced chemical compound 1302 may be applied in the form of an aerosol spray 1312. FIG. 13C shows a third non-limiting configuration 1314 where the enhanced chemical compound 1302 may be mixed with glue and applied to a staple 1316 to create a chemical barcode 1318 that can be stapled to the device 1308. FIG. 13D shows a fourth non-limiting configuration 1320 where the enhanced chemical compound 1302 may be mixed with glue and applied to a pellet 1322 to create a chemical barcode 1324 that can be inserted into a hole 1326 drilled out of the device 1308. FIG. 13E shows a fifth non-limiting configuration 1328 where the enhanced chemical compound 1302 may be heated until the enhanced chemical compound 1302 is malleable and shaped into a screw 1330 to create a chemical barcode 1332, which may then be screwed into the device 1308. FIG. 13F shows a sixth non-limiting configuration 1334 where an enhanced chemical compound (not shown in FIG. 13F) may be blended into a 3D filament 1336 by a filament extruder 1338, which may be used in a 3D printer 1340. The 3D printer 1340 can be used to print as a specific part of a medical device 1342 that could then include the enhanced chemical compound. One of ordinary skill in the art would recognize that there are a number of additional mechanisms for applying the enhanced chemical compound, for example, injection molding, casting, and many others.

The above discussion provided two examples of particular applications for the present disclosure as medical devices and bullets. Of course a wide variety of other applications and industries can benefit from the present disclosure. For example, the above described systems and methods may be used to identify integrated circuits for computer or electrical parts in computers, parts, such as ceramic brakes, used in automotive or airplane industry, any many, many others.

Thus, while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

The invention claimed is:

1. A method for identifying a subcutaneous object, the method comprising:
    identifying a chemical compound in the subcutaneous object, wherein the chemical compound is removed from an enhanced chemical compound to reduce scanning interference;
    labeling the subcutaneous object with the enhanced chemical compound;
    scanning, with reduced interference, the enhanced chemical compound label using X-Ray fluorescence (XRF);
    producing an object identifier code based on the XRF scan of the enhanced chemical compound label; and
    associating the object identifier code to the subcutaneous object.

2. The method of claim 1 wherein the enhanced chemical compound comprises a metal powder mixture.

3. The method of claim 1 wherein the object identifier code comprises a list of chemical elements included in the enhanced chemical compound.

4. The method of claim 3 wherein the list of chemical elements includes quantities of the chemical elements.

5. The method of claim 4 wherein the quantities of the chemical elements are related to percentages of the chemical elements in the enhanced chemical compound.

6. The method of claim 5 wherein the percentages of the chemical elements are rounded to the nearest percentage evenly divisible by five.

7. The method of claim 1 wherein the enhanced chemical compound is unique to the subcutaneous object.

8. The method of claim 1 wherein the subcutaneous object comprises a medical device.

9. The method of claim 1 wherein the subcutaneous object comprises a bullet.

10. A system for identifying an implanted medical device, the system comprising:
    an enhanced chemical compound coupled to the implanted medical device, wherein the enhanced chemical compound includes a spot size of greater than or equal to 0.5 cm and less than 2 cm in diameter;
    an X-Ray Fluorescence (XRF) device for scanning the enhanced chemical compound coupled to the implanted medical device and generating data about the enhanced chemical compound; and
    a display coupled to the XRF device for displaying a report including the data about the enhanced chemical compound coupled to the implanted medical device, the report indicating at least one of a kind of the implanted medical device, an owner of the implanted medical device, and a manufacturer of the implanted medical device.

11. The system of claim 10 wherein the enhanced chemical compound comprises a metal powder mixture.

12. The system of claim 10 wherein the results of the scan produce an object identifier code.

13. The system of claim 12 wherein the object identifier code comprises a list of chemical elements included in the enhanced chemical compound.

14. The system of claim 13 wherein the list of chemical elements includes quantities of the chemical elements.

15. The system of claim 14 wherein the quantities of the chemical elements are related to percentages of the elements in the enhanced chemical compound.

16. The system of claim 15 wherein the percentages of the chemical elements are rounded to the nearest percentage evenly divisible by five.

17. The system of claim 10 wherein the enhanced chemical compound coats the entire implanted medical device.

18. The system of claim 10 wherein the enhanced chemical compound is coupled to the implanted medical device via at least one of a sticker, an aerosol spray, a staple, a pellet, an injection molding, a casting, and a screw.

19. The method of claim 2 wherein the metal powder mixture includes at least one of Zinc, Aluminum, Chromium, Bismuth, Tin, Copper, Vanadium, Manganese, Nickel, and Iron Powder suitable for use with the subcutaneous object.

20. The system of claim 11 wherein the metal powder mixture includes at least one of Zinc, Aluminum, Chromium, Bismuth, Tin, Copper, Vanadium, Manganese, Nickel, and Iron Powder suitable for use with the implanted medical device.

* * * * *